United States Patent
Lange et al.

[11] Patent Number: 5,259,401
[45] Date of Patent: Nov. 9, 1993

[54] METHOD OF AND APPARATUS FOR PERFORATING CIGARETTE PAPER AND THE LIKE

[75] Inventors: Norbert Lange, Glinde; Stefan Meissner, Börnsen; Michael Walter, Hamburg, all of Fed. Rep. of Germany

[73] Assignee: Korber AG, Hamburg, Fed. Rep. of Germany

[21] Appl. No.: 834,009

[22] Filed: Feb. 11, 1992

[30] Foreign Application Priority Data

Feb. 27, 1991 [DE] Fed. Rep. of Germany ....... 4106127

[51] Int. Cl.⁵ ................................ A24C 5/00
[52] U.S. Cl. ................... 131/281; 131/280; 131/908; 219/121.61; 219/121.7
[58] Field of Search ............. 131/280, 281, 904, 905, 131/908; 219/121.6, 121.61, 121.62, 121.71, 121.83, 121.14, 121.2, 384; 318/685, 696, 615, 623, 626, 627, 645, 569, 637

[56] References Cited

U.S. PATENT DOCUMENTS

| | | | |
|---|---|---|---|
| 3,583,546 | 6/1971 | Koop | 198/33 |
| 4,090,826 | 5/1978 | Hinzmann | 131/23 R |
| 4,121,595 | 10/1978 | Heitmann | 131/21 R |
| 4,177,670 | 12/1979 | Heitmann | 73/38 |
| 4,247,754 | 1/1981 | Baier | 219/384 |
| 4,249,545 | 2/1981 | Gretz et al. | 131/281 |
| 4,383,435 | 5/1983 | Hinzmann | 73/37 |
| 4,537,206 | 8/1985 | Lorenzen et al. | 131/281 |
| 4,630,466 | 12/1986 | Berlin | 73/38 |
| 4,644,176 | 2/1987 | Heitmann | 250/572 |
| 4,648,412 | 3/1987 | Heitmann | 131/281 |
| 4,827,947 | 5/1989 | Hinz | 131/281 |

FOREIGN PATENT DOCUMENTS

1901384 9/1969 Fed. Rep. of Germany .
2751522 6/1986 Fed. Rep. of Germany .

*Primary Examiner*—V. Millin
*Assistant Examiner*—J. Doyle
*Attorney, Agent, or Firm*—Darby & Darby

[57] ABSTRACT

A running web or discrete tubular wrappers of rod-shaped articles of the tobacco processing industry are perforated with a variable-intensity high-energy pulsed laser beam which is controlled in such a way that the intensity of radiation and/or the length of pulses is altered in response to variations in the speed of advancement of the web or discrete wrappers past the perforating station. This ensures that the permeability of the thus obtained ventilation zones is not influenced by the speed of advancement of the material to be perforated past the perforating station. The intensity of radiation and/or the length of pulses can also be influenced by one or more monitored characteristics of the articles, such as the permeability of their wrappers.

22 Claims, 3 Drawing Sheets

METHOD OF AND APPARATUS FOR PERFORATING CIGARETTE PAPER AND THE LIKE

BACKGROUND OF THE INVENTION

The invention relates to improvements in methods of and in apparatus for perforating webs of wrapping material for rod-shaped smokers' products More particularly, the invention relates to improvements in methods of and in apparatus for perforating wrapping material with pulsating beams of high-energy radiation, such as laser beams. Still more particularly, the invention relates to improvements in methods of and in apparatus for perforating moving webs or discrete sections of cigarette paper, imitation cork and/or other wrapping material for plain or filter cigarettes, filter rod sections and/or other rod-shaped articles of the tobacco processing industry.

It is well known to provide the wrappers of rod-shaped articles of the tobacco processing industry with perforations which form so-called ventilation zones and serve to admit cool atmospheric air into the column of tobacco smoke flowing from the lighted end of the article toward the mouth of the smoker. As a rule, or at least in many instances, the wrapping material consists of or contains paper and the ventilation zones are formed by puncturing the wrapping material by mechanical means, by electric sparks or by beams of high-energy radiation. The perforating operation can be carried out upon a web of wrapping material or upon the tubular wrappers of discrete rod-shaped articles. If the articles are filter cigarettes, the perforations are normally provided in the region at the junction of the filter tip with the tobacco-containing portion of the article.

The provision of ventilation zones in the wrappers of rod-shaped articles of the tobacco processing industry, such as filter cigarettes, is considered to be of great importance. Thus, cool atmospheric air which is admitted into the column of hot tobacco smoke by way of perforations in the wrapper exerts a beneficial influence upon the percentages of nicotine and condensate in tobacco smoke. In order to ensure that the nicotine and condensate contents of tobacco smoke will be maintained within the prescribed range, it is important to carry out the perforating operation with utmost care, i.e., the ratio of cool atmospheric air, which is drawn into the column of hot tobacco smoke from the atmosphere by flowing through the perforations of the ventilation zone, to the quantity of smoke in a particular brand of rod-shaped smokers' articles should remain at least substantially constant. In other words, such ratio should be the same for each of a short or a long series of articles.

Mechanical perforating apparatus normally employ sets of pins, needles or analogous puncturing elements which are caused to pierce selected portions of a continuous web or of discrete sections of wrapping material for cigarettes or the like. Reference may be had, for example, to U.S. Pat. No. 4,090,826 granted May 23, 1978 to Alfred Hinzmann. A drawback of mechanical perforating apparatus is that the puncturing elements are subject to extensive wear which entails a change in the size of holes if the puncturing elements are not replaced or treated at frequent intervals. In addition, such apparatus are not overly reliable when the speed of advancement of wrapping material reaches a first range and they are incapable of properly perforating a wrapping material when the speed of advancement of such material is within a second range which is required in presently known modern high-speed cigarette making and like tobacco processing machines. Reference may also be had to published German patent application No. 19 01 384.

Published German patent application No. 27 51 522 discloses a perforating apparatus which employs a laser. The impulse sequence of the laser is synchronized with the movement of the material or article to be perforated in order to ensure that the ventilation zone (formed by a number of perforations which is necessary to ensure the admission of a requisite amount of fresh atmospheric air) will be provided at the desired location as considered in the longitudinal direction of a rod-shaped article. Such apparatus are quite satisfactory when the articles are produced at a relatively low rate or even at a higher rate but still below the rate of output of a modern high-speed cigarette making or filter tipping machine. The predictability of the locations of ventilation zones as well as of the permeability of the perforated portions of wrappers of cigarettes or like rod-shaped articles ceases to be satisfactory when the presently known perforating apparatus which employ lasers are utilized in modern high-speed machines for the making of rod-shaped articles of the tobacco processing industry.

OBJECTS OF THE INVENTION

An object of the invention is to provide a method which renders it possible to provide cigarettes and like rod-shaped articles of the tobacco processing industry with ventilation zones whose permeability and/or location is not affected by the speed at which the articles are produced or at which the ventilation zones are formed in wrapping material for tobacco and/or filter material for tobacco smoke.

Another object of the invention is to provide a novel and improved method of influencing the beam or beams of pulsating high-energy radiation which is or are used to make holes in wrapping material for cigarettes or the like.

A further object of the invention is to provide a novel and improved method of making ventilation zones with one or more laser beams.

An additional object of the invention is to provide a method which can be practiced to perforate wrapping material of rod-shaped articles in a modern high-speed filter tipping or other machine for the making or processing of rod-shaped articles of the tobacco processing industry.

Still another object of the invention is to provide a simple method which ensures predictable perforation of wrapping material in the form of a continuous web or in the form of discrete sections of a web.

A further object of the invention is to provide a method which renders it possible to take into consideration a desired number of factors which influence the quality and/or the locations of ventilation zones in filter cigarettes or other rod-shaped articles of the tobacco processing industry.

Another object of the invention is to provide a novel and improved apparatus for the practice of the above outlined method.

An additional object of the invention is to provide a machine which serves to make rod-shaped articles of the tobacco processing industry and embodies an apparatus for the practice of the above outlined method.

A further object of the invention is to provide the apparatus with novel and improved means for influencing the beam or beams of high-energy radiation which are used to perforate cigarette paper or other wrapping material for rod-shaped articles of the tobacco processing industry.

Another object of the invention is to provide an apparatus which can be utilized in modern high-speed filter tipping and other cigarette making or like machines as a superior substitute for heretofore known apparatus, and which can provide the wrapping material with satisfactory ventilation zones irrespective of the selected speed of the machine.

Still another object of the invention is to provide an apparatus wherein the beam or beams of high-energy radiation can be controlled and modified in a simple and efficient manner, which can stand long periods of uninterrupted use, and which can be installed in existing filter tipping and/or other machines for the making of rod-shaped articles of the tobacco processing industry.

A further object of the invention is to provide an apparatus which is constructed and assembled in such a way that the controls for the beam or beams of high-energy radiation can remain idle when the machine embodying the apparatus is operated at an optimal speed.

Another object of the invention is to provide an apparatus which can be used in a production line and can conform the making of ventilation zones to eventual variations of the speed of the production line as a result of malfunction of one or more machines or groups of machines.

An additional object of the invention is to provide an apparatus which is capable of making ventilation zones of desired permeability and shape at any of a wide variety of different speeds of making rod-shaped articles of the tobacco processing industry and/or at any of a number of different speeds of providing a web of wrapping material with ventilation zones.

SUMMARY OF THE INVENTION

One feature of the present invention resides in the provision of a method of perforating wrapping material (e.g., cigarette paper or imitation cork) for cigarettes, filter rod sections or other rod-shaped products of the tobacco processing industry. The improved method comprises the steps of conveying the wrapping material along a predetermined path, directing at least one high-energy pulsed radiation beam upon the wrapping material in a predetermined portion of the path, monitoring at least one variable parameter, and altering the length of pulses of the at least one beam as a function of monitored variations of the at least one parameter. The conveying step can include advancing the wrapping material at a variable speed, and the at least one parameter can constitute the speed of wrapping material.

If the at least one high-energy beam is a variable-intensity beam, the method can further comprise the steps of generating signals denoting the speed of wrapping material and utilizing the signals to adjust the intensity of the at least one beam as a function of variations of the speed of wrapping material. The conveying step can be carried out in a variable-speed machine (such as a filter tipping machine), and the signals can denote the speed of the machine.

The parameter which is monitored to alter the length of pulses of the at least one beam can but need not be the same parameter (the speed of the wrapping material) which is used to generate signals serving to adjust the intensity of radiation of the at least one beam.

The conveying step can include advancing the wrapping material at a plurality of speeds including a nominal speed, and the altering step then preferably includes maintaining the length of pulses at a nominal value when the speed of wrapping material matches or approximates the nominal speed. Analogously, if the intensity of radiation of the at least one beam is altered as a function of variations of the speed of the wrapping material, the intensity of radiation can be maintained at a nominal value when the speed of wrapping material matches or approximates the aforementioned nominal speed.

It is presently preferred to carry out the method in such a way that the length of pulses is reduced in response to increasing speed of the wrapping material, that the length of pulses is increased in response to decreasing speed of the wrapping material, that the intensity of radiation is increased in response to increasing speed of the wrapping material, and that the intensity of radiation is reduced in response to decreasing speed of the wrapping material.

The material can constitute an elongated web. Alternatively, the wrapping material can constitute a succession of tubular wrappers each of which surrounds a rod-like filler of fibrous material (such as tobacco and/or filter material for tobacco smoke).

The method can further comprise the steps of monitoring at least one characteristic of rod-shaped products which characteristic is dependent upon the permeability of perforated wrapping material, and altering the length of pulses and/or the intensity of radiation of the at least one beam when the monitored characteristic deviates from a reference value. Such altering of the length of pulses and/or of the intensity of radiation of the at least one beam is carried out until the monitored characteristic at least approximates the reference value.

Another feature of the invention resides in the provision of an apparatus for perforating wrapping material for rod-shaped articles of the tobacco processing industry. The improved apparatus comprises means for conveying wrapping material along a predetermined path, a source of variable-intensity high-energy pulsed radiation, means for directing at least one beam of radiation from the source into a predetermined portion of the path so that the beam impinges upon the wrapping material, means for monitoring at least one variable parameter (particularly the speed of wrapping material in the predetermined path), and means for altering at least one of a plurality of variable qualities of the at least one beam in response to monitored variations of the at least one variable parameter. In accordance with a presently preferred embodiment of the apparatus, the variable qualities of the at least one beam include the length of pulses and the intensity of radiation of the at least one beam.

The radiation source preferably includes or constitutes a laser.

The apparatus can be utilized to perforate a running web of wrapping material. The conveying means then includes means for advancing the web along the predetermined path, and the directing means includes means for directing the at least one beam upon the running web of wrapping material. Alternatively, the apparatus can be utilized to perforate wrapping material in a tobacco and/or filter material processing machine of the tobacco processing industry, particularly in a filter tipping machine wherein the wrapping material is conveyed along the predetermined path in the form of a series of discrete tubular wrappers each of which surrounds a rod-like filler of fibrous material. The directing means of such apparatus comprises means for directing the at least one beam against successive tubular wrappers of the series of such wrappers.

The conveying means is preferably designed to advance the wrapping material at a variable speed and, as already mentioned hereinbefore, the monitoring means preferably includes means for monitoring the speed of the wrapping material. The altering means of such apparatus preferably (but not necessarily) comprises means for altering the length of pulses as well as the intensity of radiation of the at least one beam in response to monitored variations of the speed of wrapping material. Alternatively, the altering means can be designed to alter only the length of pulses or to alter only the intensity of radiation of the at least one beam in response to detected variations of the speed of wrapping material.

The altering means can include means for determining the intensity of radiation of the at least one beam as a function of monitored speed of the wrapping material and for generating first signals denoting the determined intensity, means for determining the length of pulses of the at least one beam as a function of monitored speed of the wrapping material and for generating second signals denoting the determined length of pulses, and means for processing the first and second signals into third signals which are transmitted to the source to influence the length of pulses and the intensity of radiation of the at least one beam. Such altering means can further comprise a memory for fourth signals which denote the frequency of pulses, and such fourth signals are transmitted to an input of the processing means. The source which is controlled by the just described altering means can comprise a first unit which is connected to the directing means and a second unit which is connected between the processing means and the first unit.

If the conveying means comprises means for advancing the wrapping material at a plurality of different speeds and the monitoring means includes means for generating signals which denote the speed of the wrapping material, the altering means can comprise means for storing a first reference signal denoting a nominal speed of the wrapping material, a second reference signal denoting a nominal pulse length, and a third reference signal denoting a nominal intensity of radiation of the at least one beam, and means for imparting to the at least one beam the nominal pulse length and the nominal intensity when the monitored speed of the wrapping material matches or approximates the nominal speed.

The apparatus can further comprise means for testing at least one variable characteristic of rod-shaped products which characteristic is dependent upon the porosity of perforated wrapping material and for generating signals which denote the at least one characteristic, and means for processing the signals and for transmitting processed signals to the altering means. As mentioned above, the altering means can include means for storing a reference signal (preferably a variable reference signal) which denotes a nominal pulse length, and such altering means preferably further comprises means for varying the reference signal denoting the nominal pulse length in dependency on deviations of the at least one variable characteristic from a predetermined value.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
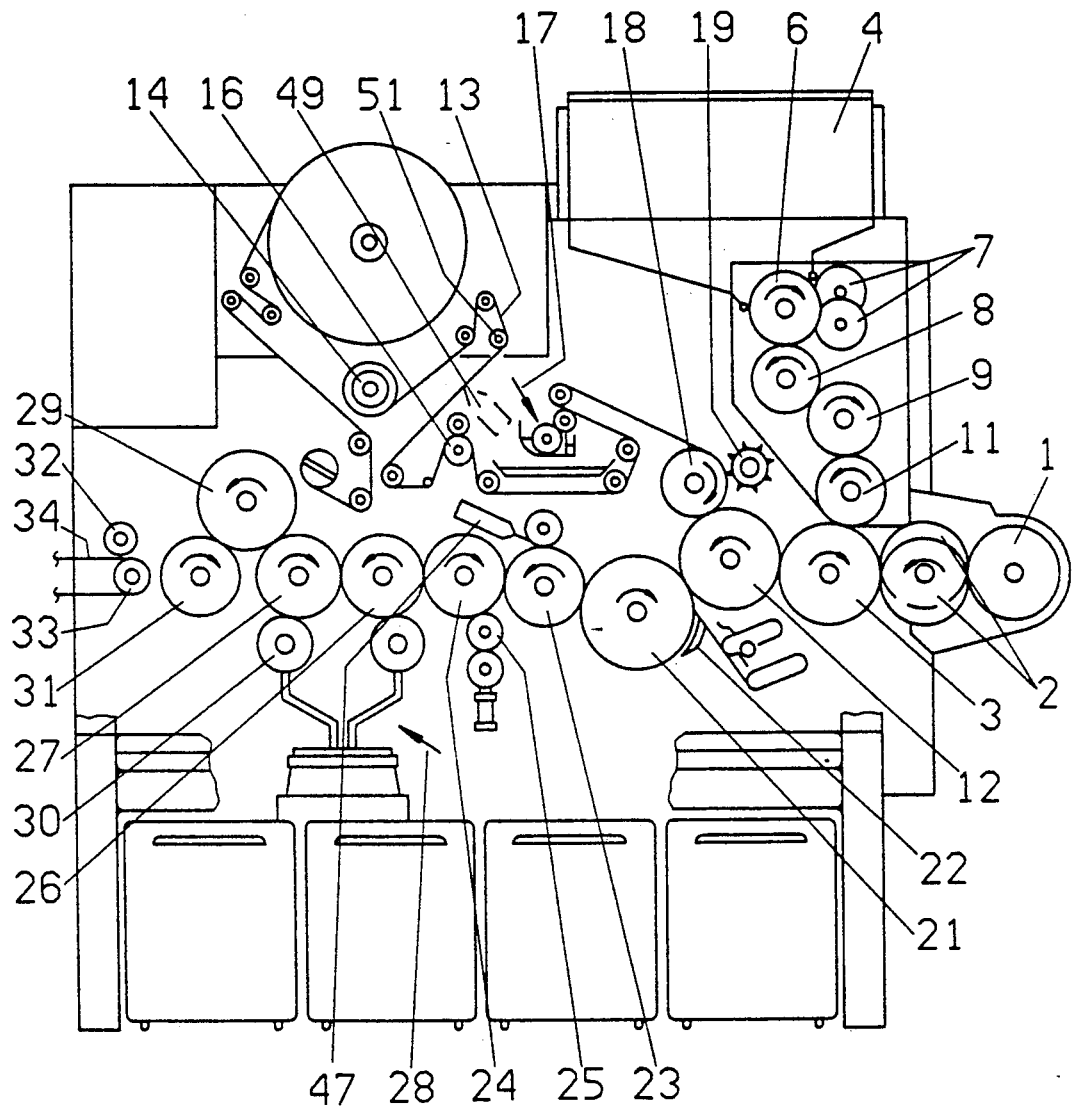
FIG. 1 is a schematic front elevational view of a filter tipping machine embodying two apparatus one of which is designed to make perforations in the tubular wrappers of successive pairs of coaxial filter cigarettes and the other of which is designed to form ventilation zones in spaced-apart portions of a running web of wrapping material for filter cigarettes.

FIG. 1 is a front elevational view of a filter tipping machine of the type known as MAX-S (manufactured and distributed by the assignee of the present application). The machine comprises a rotary drum-shaped fluted conveyor 1 which receives plain cigarettes of unit length from a cigarette making machine, not shown, in such a way that each of its peripheral flutes contains a single plain cigarette and that the cigarettes in successive flutes are staggered relative to each other in the axial direction of the conveyor 1. Successive oddly numbered flutes of the conveyor 1 deliver plain cigarettes to one of two rotary drum-shaped fluted aligning conveyors 2, and successive evenly numbered flutes of the conveyor 1 deliver plain cigarettes to the other aligning conveyor 2. The aligning conveyors 2 are driven at different speeds and/or advance the respective plain cigarettes along paths having different lengths in order to ensure that each axially parallel peripheral flute of a rotary drum-shaped assembly conveyor 3 receives a pair of coaxial plain cigarettes of unit length in such a way that the cigarettes are spaced apart a distance at least matching the length of a filter mouthpiece of double unit length.

The top portion of the frame of the filter tipping machine carries a magazine 4 for a supply of parallel filter rod sections of six times unit length. The outlet of the magazine 4 admits filter rod sections into the flutes of a rotary drum-shaped severing conveyor 6 which cooperates with two axially staggered rotary disc-shaped knives 7 to subdivide each filter rod section into a row of three coaxial filter mouthpieces of double unit length. The severing conveyor 6 delivers the thus obtained mouthpieces of double unit length to three disc-shaped rotary components of a staggering conveyor 8 which staggers the mouthpieces of each row in the circumferential direction and delivers the thus staggered mouthpieces into discrete axially parallel peripheral flutes of a rotary shuffling conveyor 9. The latter cooperates with stationary cams or like parts (not specifically shown) to convert the mouthpieces in its flutes into a single file of aligned mouthpieces, and successive mouthpieces of such single file are transferred into successive flutes of a rotary drum-shaped accelerating and inserting conveyor 11. The latter delivers successive mouthpieces of the single file into the spaces between pairs of plain cigarettes in successive flutes of the assembly conveyor 3 so that each flute of the conveyor 3 contains a group of three coaxial rod-shaped components, namely a pair of plain cigarettes of unit length and a mouthpiece of unit length between the plain cigarettes. Such groups are caused to advance between two stationary condensing cams (not shown) which shorten the groups so that the pairs of plain cigarettes abut the adjacent ends of the respective mouthpieces before the thus condensed groups are transferred into successive flutes of a rotary drum-shaped transfer conveyor 12.

The frame of the filter tipping machine further supports a bobbin or reel 14 having a rotary core surrounded by a convoluted web 13 of wrapping material, e.g., cigarette paper, imitation cork or other material known as tipping paper. The web 13 is drawn off the reel 14 by advancing rolls 16 which are located upstream of a paster 17 serving to coat one side of the web with a suitable adhesive. The paster 17 is followed by a rotary drum-shaped suction conveyor 18 which cooperates with a rotary knife 19 to repeatedly sever the leader of the running web 13 so that the latter yields a series of discrete uniting bands which are attached to successive groups of rod-shaped components in the flutes of the transfer conveyor 12. The arrangement is such that each uniting band extends along the entire filter mouthpiece of double unit length as well as along the adjacent inner end portions of the respective plain cigarettes of unit length.

The transfer conveyor 12 delivers successive groups (each of which carries a uniting band) into successive flutes of a rotary drum-shaped rolling or convoluting conveyor 21 which cooperates with a stationary or mobile rolling member 22 to convert each uniting band into a tubular wrapper which surrounds the respective filter mouthpiece as well as the adjacent end portions of the respective plain cigarettes of unit length. Thus, the groups and the respective uniting bands are converted into filter cigarettes of double unit length which are transferred into successive flutes of a rotary drum-shaped conveyor 23 (see also FIG. 2) forming part of an apparatus which provides each half of each filter cigarette of double unit length with a ventilating zone and is constructed and assembled and operates in accordance with a first embodiment of the present invention.

The thus treated filter cigarettes of double unit length are transferred into successive flutes of a rotary drum-shaped severing conveyor 24 which cooperates with a rotary disc-shaped knife 25 to divide each filter cigarette of double unit length into two filter cigarettes of unit length. Each filter cigarette of double unit length is severed midway across its tubular wrapper so that each filter cigarette of unit length contains a plain cigarette of unit length, a mouthpiece of unit length and one-half of a tubular wrapper (convoluted uniting band). Defective filter cigarettes are segregated from satisfactory filter cigarettes during advancement in the flutes of the severing conveyor 24. Satisfactory filter cigarettes (namely those which contain all three of the aforementioned components) are transferred into successive flutes of a further rotary drum-shaped conveyor 26 so that each flute of the conveyor 26 receives two coaxial filter cigarettes of unit length. The conveyor 26 forms part of an inverting or turn-around device 28 of the type described and shown, for example, in commonly owned U.S. Pat. No. 3,583,546 granted Jun. 8, 1971 to Gerhard Koop. The turn-around device 28 further comprises a rotary drum-shaped conveyor 27 which receives a file of non-inverted filter cigarettes of unit length from the conveyor 26 and a file of inverted filter cigarettes of unit length from a further rotary drum-shaped conveyor 30. The arrangement is such that successive evenly numbered flutes of the conveyor 27 contain non-inverted filter cigarettes and successive oddly numbered flutes of the conveyor 27 contain inverted filter cigarettes. This ensures that successive flutes of a rotary drum-shaped testing conveyor 29 receive a single file of filter cigarettes with filter mouthpieces facing in the same direction. The testing conveyor 29 cooperates with means for monitoring one or more characteristics of successive filter cigarettes of unit length and the conveyor 29 delivers the tested cigarettes to a segregating conveyor 31 which cooperates with a suitable ejector (e.g., a pneumatic ejector, not shown) to expel defective filter cigarettes into a collecting receptacle or onto a conveyor, not shown. For example, the testing conveyor 29 can comprise or can cooperate with devices which ascertain the permeability of the tubular wrappers of filter cigarettes of unit length, the quality of seams formed by the overlapping marginal portions of tubular wrappers, the presence or absence of frayed ends, the condition of the tobacco-containing end portions of filter cigarettes, the presence or absence of smudges, smears or other unsightly stains on the wrappers and/or others. Satisfactory filter cigarettes of unit length advance beyond the ejecting or segregating conveyor 31 to be deposited on the upper reach of a belt conveyor 34 trained over pulleys 33 (only one shown) and cooperating with a rotary brake 32 to advance satisfactory filter cigarettes of unit length to storage, into a packing machine or to another destination.

The conveyor 23 is driven to rotate in the direction of arrow 37 (FIG. 2) and its axially parallel peripheral flutes 41 receive complete filter cigarettes 36 of double unit length from the rolling or convoluting conveyor 21. The cigarettes 36 are advanced at right angles to their longitudinal axes (i.e., sideways) and their tubular wrappers are perforated during advancement through a perforating station 38. The body of the conveyor 23 is formed with suction ports 39 which are connected to a suction generating device (not shown) to attract the filter cigarettes 36 during transport through the perforating station 38 but to permit the transfer of treated cigarettes 36 onto the severing conveyor 24. The peripheral surface of the conveyor 23 is provided with axially parallel entraining projections 40 (only two shown) which alternate with convex sections 42 cooperating with complementary convex sections 43 of the peripheral surface of a roller 46 which is driven to rotate in the direction of arrow 44 at the peripheral speed of the conveyor 23. The distance of a section 42 from the adjacent section 43 equals or is slightly less than the diameter of a filter cigarette 36 of double unit length.

A filter cigarette 36a which approaches the perforating station 38 abuts the projection 40 in front of it and is attracted to the conveyor 23 by the respective suction port 39 and extends into the respective flute 41. Such cigarette is engaged by the leading edge of the oncoming section 43 of the roller 46, and the section 43 cooperates with the adjacent section 42 to ensure that the filter cigarette 36a rotates about its axis but does not move in the direction of arrow 37. During such rotation about its own axis, the cigarette 36a is acted upon by one or more beams 48 of high-energy radiation issuing from a source 47 (e.g., a $CO_2$ laser) which provides the wrapper of the cigarette 36a with a ventilation zone for each of its halves, i.e., for each filter cigarette of unit length. When the perforating step is completed, the cigarette 36a is entrained by the oncoming projection 40 of the conveyor 23 (which continuously rotates in the direction of arrow 37) and is advanced to and beyond the position 36b, namely toward and onto the severing conveyor 24. The radiation source 47 includes a mirror 47a which directs the beam or beams 48 of high-energy radiation into the perforating station 38, i.e., against selected portions of tubular wrappers of successive filter cigarettes 36 of double unit length. The beam 48 of radiation is pulsed in such a way that the tubular wrapper of each filter cigarette 36 (in the position 36a) is provided with two ventilation zones of desired permeability. The manner of controlling the perforating operation will be described in greater detail with reference to FIG. 3. The apparatus at the perforating station 38 can comprise two lasers or other suitable sources of high-energy radiation, namely one for each half of a filter cigarette 36 which reaches the position 36a at the perforating station 38.

Figure 2:
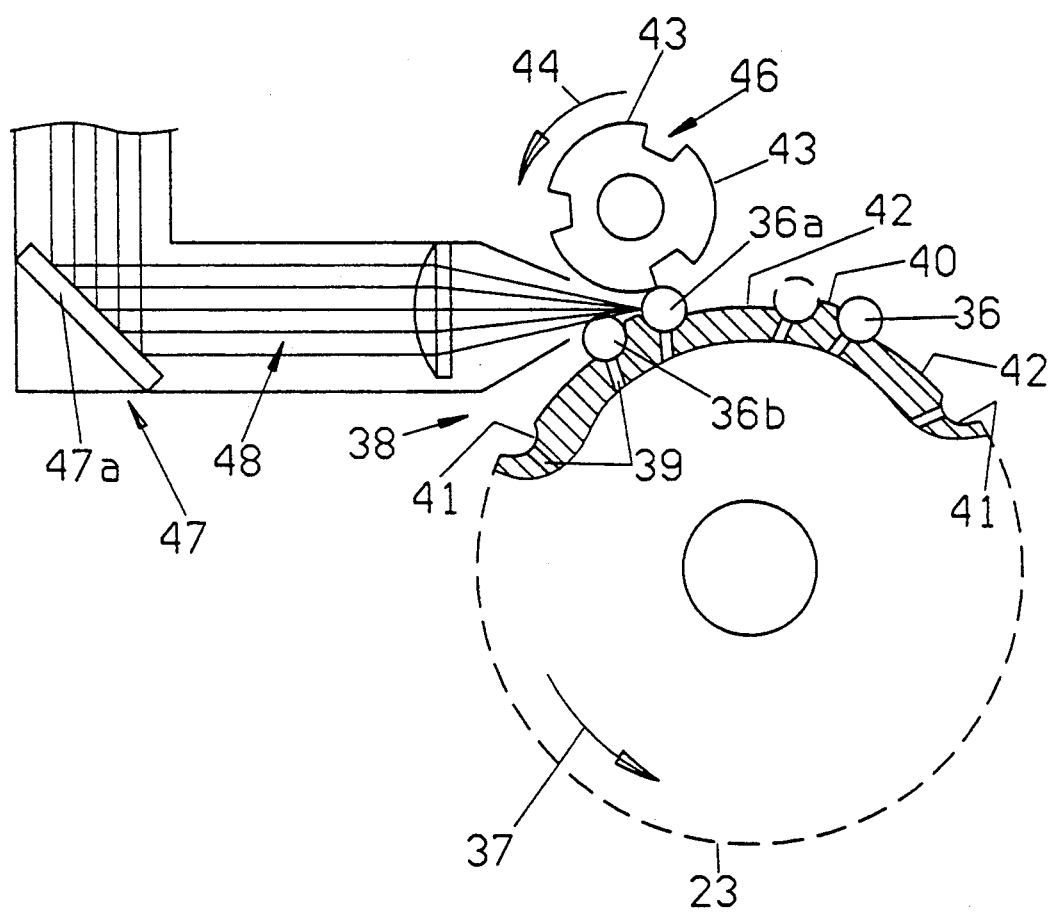
FIG. 2 is an enlarged view of a detail in the machine of FIG. 1, with a portion of a rotary conveyor for filter cigarettes broken away, and shows certain details of the one apparatus which serves to make ventilation zones in the tubular wrappers of filter cigarettes.

Additional details of filter tipping machines of the type shown in FIGS. 1 and 2 are described and shown, for example, in commonly owned U.S. Pat. Nos. 4,383,435 (granted May 17, 1983 to Alfred Hinzmann), U.S. Pat. No. 4,630,466 (granted Dec. 23, 1986 to Herbert Berlin), U.S. Pat. No. 4,177,670 (granted Dec. 11, 1979 to Uwe Heitmann et al.) and U.S. Pat. No. 4,644,176 (granted Feb. 17, 1987 to Uwe Heitmann et al.). U.S. Pat. No. 4,247,754 (granted Jan. 27, 1981 to Anton Beier) discloses an apparatus for perforating webs of wrapping material with pairs of electrodes.

U.S. Pat. Nos. 4,648,412 (granted Mar. 10, 1987 to Uwe Heitmann) and U.S. Pat. No. 4,121,595 (granted Oct. 24, 1978 to Uwe Heitmann et al.) disclose apparatus for perforating wrapping material with laser beams.

Figure 3:
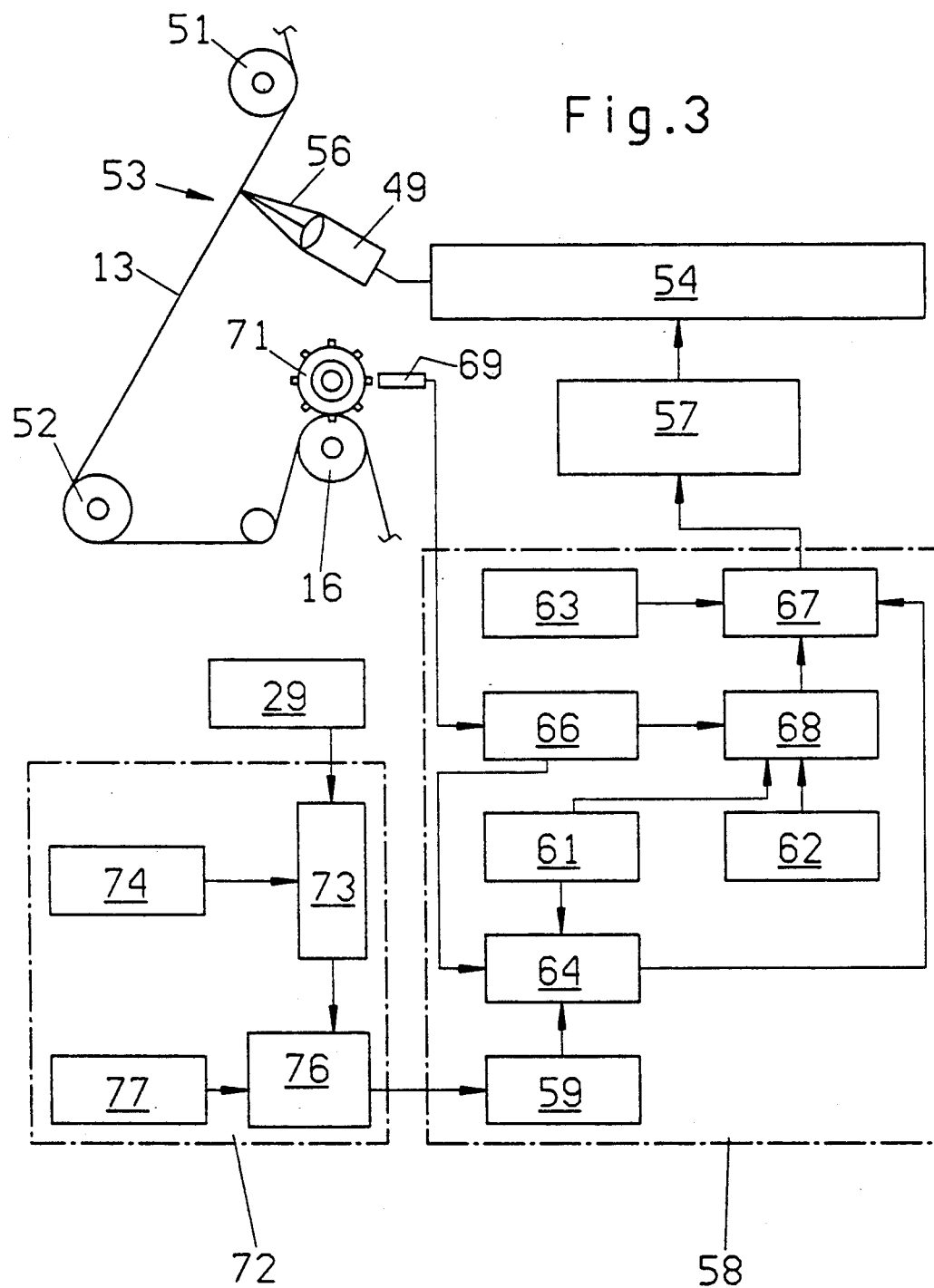
FIG. 3 is an enlarged view of the other apparatus which is used to make ventilation zones in longitudinally spaced apart portions of a running web of wrapping material.

The apparatus of FIG. 3 can be utilized in lieu of the apparatus which is shown in FIG. 2 The apparatus of FIG. 3 serves to provide ventilation zones in longitudinally spaced apart portions of the running web 13 of tipping paper at a perforating station 53 between two pulleys 51, 52. The apparatus comprises a radiation source (e.g., a laser) including a first unit 54 which is connected with a head 49 serving to direct at least one beam 56 of high-energy variable-intensity pulsed radiation against the running web 13 in that portion of the elongated path for the web which is located between the pulleys 51 and 52. The web 13 is advanced by the conveying means including the advancing rolls 16 and the rotary suction drum 18. The unit 54 can constitute a laser and the unit 57 can constitute a supplying or servicing assembly for the laser. The unit 57 can provide the laser 54 with electrical energy and other necessary operating means. The unit 57 is controlled by a circuit 58 serving as a means for altering at least one variable quality of the beam 56.

The altering means 58 (hereinafter called control circuit) comprises a memory 59 serving as a means for storing a reference signal denoting a predetermined nominal pulse length, a memory 61 serving as a means for storing a reference signal denoting a predetermined speed of the web 13, a memory 62 serving as a means for storing a reference signal denoting a predetermined nominal intensity of radiation of the beam 56, and a memory 63 serving as a means for storing signals denoting predetermined sequences or frequencies of pulses. Still further, the control circuit 58 comprises a pulse length calculating or determining circuit 64 having inputs connected with the memories 59, 61 and with a speed calculating circuit 66. The purpose of the circuit 64 is to calculate or determine an optimal pulse length for each machine speed which departs from the nominal speed, i.e., for each speed of the web 13 which departs from a nominal speed. The output of the circuit 64 is connected with the corresponding input of a pulse calculating circuit 67 which transmits processed signals to the unit 57. An intensity calculator 68 serves as a means for determining the intensity of radiation of the beam 56 as a function of monitored speed of the filter tipping machine and web 13; this calculator 68 is connected with the outputs of the memories 61, 62 and circuit 66, and its output is connected with the corresponding input of the pulse calculating circuit 67. The speed calculating circuit 66 receives signals from a monitoring device 69 serving as a means for monitoring a variable parameter (speed) of the web 13 and filter tipping machine. The monitoring device 69 transmits signals at a frequency which is determined by a timer disc 71 rotating in synchronism with the advancing roll 16 of FIG. 3, i.e., at a speed which is indicative of the speed of the web 13 and of the speed of the filter tipping machine.

The reference signal which is stored in the memory 59 and denotes the nominal pulse length of the beam 56 can be applied from without, e.g., by a keyboard (not shown), and is not indicative of any quality or qualities (such as the permeability and/or draw resistance) of finished rod-shaped articles (such as the filter cigarettes of unit length which are tested during advancement with the conveyor 29 of FIG. 1). In order to take into consideration one or more qualities of the finished rod-shaped articles, the apparatus of FIG. 3 further comprises a regulating circuit 72 which can transmit appropriate signals to the memory 59 of the control circuit 58. The regulating circuit 72 receives signals from the testing means including the conveyor 29 which transmits such signals to a comparator circuit 73 of the regulating circuit 72. For example, signals which are transmitted from the testing means (including the conveyor 29) to the comparator circuit 73 can denote the permeability (degree of ventilation) of the wrappers of successive filter cigarettes of unit length which are being tested during advancement with the flutes of the conveyor 29. The regulating circuit 72 further comprises a memory 74 which constitutes a means for storing a reference signal denoting the desired permeability of filter cigarettes. The comparator 73 compares the reference signal from 74 with signals which are received from the testing means including the conveyor 29 and delivers signals denoting the difference between the signals from 29 and 74 to a signal processing circuit 76 which is further connected to a memory 77 serving to store a signal denoting a predetermined nominal pulse length.

The exact mode of perforating the tubular wrappers of rod-shaped articles of the tobacco processing industry or a running web of wrapping material for rod-shaped fillers of such articles with one or more beams of high-energy radiation (such as one or more laser beams)

is well known in the art of making cigarettes and like rod-shaped articles with ventilation zones. Reference may be had, for example, to the aforementioned published German patent application No. 27 51 522. Therefore, the following passages will deal primarily or exclusively with the method of and means for regulating the length of pulses and/or the intensity of radiation of the beam 56 in accordance with the present invention.

The monitoring device 69 and the timing disc 71 can be said to constitute a proximity detector which transmits to the speed calculating circuit 66 of the control circuit 58 a series of signals at a frequency denoting the monitored speed of the web 13 and of the filter tipping machine. Such signals are also indicative of the speed of rotation of successive filter cigarettes 36 of double unit length about their respective axes during dwell at the perforating station 38 of FIG. 2. Thus, the length of pulses and/or the intensity of the beam 48 which is shown in FIG. 2 can be controlled in a manner which is analogous to the manner of controlling the pulse length and/or the intensity of radiation of the beam 56 in the apparatus of FIG. 3.

The circuit 66 transmits processed signals to the pulse length calculating or determining circuit 64 which is further connected with the memories 59 and 61. As mentioned above, the memory 61 stores a reference signal denoting a predetermined nominal speed of the web 13 and filter tipping machine, and such nominal speed preferably corresponds to a highest speed, i.e., to that speed at which the web 13 must be advanced by the rolls 16 and drum 18 when the filter tipping machine of FIG. 1 turns out filter cigarettes at a maximum rate. A reference signal denoting the corresponding nominal pulse length is stored in the memory 59; such signal is selected in dependency upon the desired qualities of filter cigarettes of unit length. The reference signals denoting the nominal values which are stored in the memories 59 and 61 can be fed by hand or they can be stored in a program selecting memory which is addressed in order to account for different types of wrapping materials and/or different brands of filter cigarettes. In other words, information which is stored in the memories 59, 61 can be stored in a further memory and fresh information is transmitted to the memories 59, 61 whenever the machine is set up to turn out different types of rod-shaped articles of the tobacco processing industry.

When the actual machine speed (i.e., the actual speed of the web 13 which is monitored by the device 69) matches or closely approximates the speed denoted by the reference signal which is stored in the memory 61 (this is preferably the case when the machine is operated at the nominal (maximum) speed), the pulse calculating circuit 64 transmits to the processing or calculating circuit 67 a signal or a series of signals corresponding to the reference signal in the memory 59. At the same time, the intensity calculating or determining circuit 68 (which is connected with the calculating circuit 66 and with the memory 61) transmits to the circuit 67 a signal or a series of signals corresponding to the nominal intensity reference signal which is stored in the memory 62. The processing or calculating circuit 67 controls the unit 57 in such a way that the web 13 is perforated by a beam 56 having the nominal pulse length and the nominal radiation intensity. The frequency or sequence of pulses of the beam 56 which is used to perforate the running web 13 is determined by information which is stored in the memory 63. This ensures that the ventilation zones which are formed by the beam 56 are properly spaced apart from each other in the longitudinal direction of the running web 13.

If the signals from the monitoring device 69 to the circuit 66 indicate that the actual speed of the web 13 is less than nominal speed, the circuit 64 calculates the optimal pulse length for such speed of the web 13 and transmits appropriate signals to the circuit 67. The circuit 64 processes the signals from the circuit 66 in accordance with a predetermined function to select a pulse length which is best suited for the changed speed of the web 13. The functional relationship between various speeds of the web 13 and the corresponding optimal pulse lengths can be ascertained empirically in a laboratory, and the corresponding data are stored in a memory of the circuit 64. The information can be in the form of a linear function which enables the circuit 64 to calculate appropriate pulse lengths for each of a series of progressively increasing speeds of the web 13 up to the nominal (maximum) speed. The arrangement is such that the pulse length decreases linearly with increasing speed of the web 13. If a linear function is not sufficiently accurate for controlling the beam 56, the memory of the circuit 64 can store information denoting one or more non-linear functions.

The mode of operation is analogous in connection with the determination of appropriate radiation intensities for different speeds of the web 13 and filter tipping machine. The intensity calculating or determining circuit 68 stores information denoting a functional relationship between various machine (web) speeds and various intensities. The arrangement is such that the radiation intensity is increased as the pulse length decreases (i.e., as the speed of the web 13 increases) and vice versa. The intensity matches the nominal intensity (denoted by the reference signal which is stored in the memory 62) when the speed of the web 13 reaches the nominal (maximum) speed. The functional relationship of the web speed and radiation intensity can be a linear relationship if this suffices to the manufacturer of filter cigarettes (as far as the quality of the ventilation zones is concerned). If the quality requirements are higher, the information which is stored in the memory of the circuit 68 is of a more complex nature. Based on the results of laboratory experiments, the functional relationship between the speed of the web 13 and the intensity of radiation is rather complex so that such relationship is normally expressed by a non-linear function which ensures that the intensity increases with increasing speed of the web and reaches the nominal intensity when the machine speed rises to the nominal value.

The circuit 67 processes the information which is supplied by the circuits 64 and 68, and the processed information is transmitted to the unit 57 which controls the unit 54 and hence the beam 56 so that the pulse length and the radiation intensity are properly related to the momentary speed of the web 13. Thus, the quality (particularly the uniformity) of ventilation zones which are formed by the beam 56 remains unchanged irrespective of variations of speed of the web 13 and filter tipping machine.

The storage of a reference signal (in the memory 59) which is indicative of a predetermined nominal pulse length when the speed of the web 13 reaches a nominal value contributes to uniformity of perforation of the web, i.e., to uniformity of the ventilation zones. This ensures that the porosity of the web 13 is influenced in an optimal way. However, this does not take into consideration one or more qualities of the rod-shaped articles (filter cigarettes of unit length) which are turned out by the machine of FIG. 1, namely those qualities of the articles which are influenced or affected by the permeability of their wrappers. Such qualities include, for example, the so-called draw resistance of filter cigarettes (i.e., the resistance which the filler of a cigarette offers to the flow of tobacco smoke into the mouth of a smoker) and the degree of ventilation of the wrappers of cigarettes which are tested during advancement with the flutes of the conveyor 29. Since the acceptability of finished articles is judged more on the basis of the above outlined qualities of the articles than on the basis of the permeability of their wrappers, it is desirable to take such qualities into consideration for adjustment of the unit 57 (and hence of the unit 54) in response to changes of speed of the web 13. This is achieved with the regulating circuit 72 whose signal processing circuit 76 controls the reference signal in the memory 59 of the control circuit 58. For example, the testing means including the conveyor 29 ascertains the degree of ventilation of successive filter cigarettes of unit length, and corresponding signals are transmitted to the comparator circuit 73 which compares the signals from the testing means with the reference signal in the memory 74. The output of the circuit 73 transmits a signal when the actual degree of ventilation departs from that denoted by the reference signal in the memory 74, and the thus obtained signals are transmitted to the processing circuit 76 which is further connected with the memory 77. The latter stores a reference signal denoting the nominal pulse length, and the circuit 76 changes the reference signal in the memory 59 so as to take into consideration the departure of the degree of ventilation (determined by the testing means including the conveyor 29) from an optimal value. The adjustment continues until the monitored degree of ventilation matches the desired optimal value. Thus, the length of pulses is controlled in dependency on the speed of the web 13 as well as in dependency on information which is supplied by the testing means and is processed in the regulating circuit 72. This ensures that the degree of ventilation matches the desired optimum value.

When the machine is started, the monitoring device 69 indicates a low speed of the web 13. The circuits 64 and 68 then transmit appropriate signals which induce the processing circuit 67 to set the unit 57 and the unit 54 accordingly, i.e., the pulse length and the intensity of radiation of the beam 56 conform to the momentary speed of the web 13. As the speed of the web 13 increases, the circuit 64 causes a shortening of the pulses and the circuit 68 causes an intensification of the radiation. All this is effected in accordance with the information which is stored in the memories of the circuits 64 and 68. Consequently, the intensity of radiation and the length of pulses of the beam 56 are regulated in such a way that the ventilation zones which are formed in spaced apart portions of the running web 13 do not change in response to changing speed of the web. When the web 13 is accelerated to its nominal (maximum) speed, the length of pulses corresponds to that denoted by the reference signal stored in the memory 59 and the intensity of radiation corresponds to that denoted by the reference signal which is stored in the memory 62. The value of the reference signal which is stored in the memory 59 is altered by the regulating circuit 72 (when necessary) in dependency on the signals which are transmitted by the testing means including the conveyor 29.

FIG. 3 shows various elements of the circuits 58 and 72 as discrete components. Such mode of illustrating the controls for the source 54, 57 of high-energy radiation has been selected for convenience of illustration and for convenience of description of the mode of operation. In actual practice, a modern filter tipping or other machine of the tobacco processing industry will employ a signal evaluating device in the form of a computer which need not be equipped with discrete components corresponding to those shown by the blocks 59, 61-64, 66-68, 72-74 and 76 of FIG. 3 even though it can perform all of the aforediscussed operations in the aforediscussed manner. The various blocks of FIG. 3 denote the important steps to be carried out by the computer which evaluates and processes the signals from the monitoring device 69 and from the testing means including the conveyor 29.

The improved method and apparatus ensure optimal selection of pulse length and radiation intensity for each of various speeds of the filter tipping machine and web 13. This, in turn, ensures that the array of perforations in a ventilation zone and the permeability of the ventilation zones invariably meet the required standards. In addition, the making of perforations is or can be influenced by at least one quality of the finished products which is of importance for their acceptability to the manufacturer and to the ultimate consumers. It has been found that the improved method and apparatus ensure that the machine can turn out rod-shaped articles of superior quality irrespective of variations of one or more parameters, particularly the machine speed, i.e., the speed of rotation of the articles 36 at the perforating station 38 of FIG. 2 or the speed of translatory movement of the web 13 between the pulleys 51, 52 of FIG. 3.

By controlling the length of pulses in the above described manner, the apparatus of the present invention ensures that the length of holes which are formed by the beam 48 or 56 (as seen in the direction of advancement of wrapping material at the perforating station 38 or 53) is not affected by variations of speed of movement of the wrapping material. This, in turn, ensures that the permeability of each ventilation zone equals or closely approximates an optimal value. Regulation of radiation intensity is desirable and advantageous because this ensures that a requisite amount of radiation energy reaches the perforating station irrespective of changes of pulse length. This, too, contributes to the making of optimal ventilation zones regardless of the momentary speed and/or variations of the speed of the wrappers at the station 38 and/or the web 13 at the station 53. As mentioned above, the length of pulses decreases with increasing speed of wrapping material whereas the intensity of radiation increases. Inversely, the length of pulses increases and the intensity of radiation decreases in response to decreasing speed of the wrapping material.

It is presently preferred to monitor the speed of the machine in which the improved apparatus is put to use because such speed can be ascertained in a simple and efficient manner. In addition, the machine speed is sufficiently related to the speed of wrapping material. However, it is equally within the purview of the invention to utilize means for directly monitoring the speed of the web 13 at the perforating station 53 of FIG. 3 or the rotational speed of the wrappers at the perforating station 38 of FIG. 2.

The provision of memories 59, 61, 62 and 66 contributes to simplicity and reliability of the control circuit 58. Thus, the processing of signals can be greatly reduced by storing data pertaining to the nominal speed of the web 13 or to the nominal speed of wrappers of rod-shaped articles, by storing data pertaining to the nominal pulse length and by storing data pertaining to the nominal intensity of radiation. Once the speed of the machine reaches the nominal (maximum) speed, and the machine is normally operated at such nominal speed, it is not necessary to process any signals because the units 54, 57 of the source of high-energy radiation are controlled by signals which are stored in the memories 59 and 62. In other words, the control circuit 58 need not carry out any extensive internal calculations when the machine is operated at its nominal speed because the circuits which influence the units 54, 57 then simply utilize signals which are stored in the memories 59 and 62. Thus, the pulse length and/or the intensity of radiation will be altered primarily or exclusively during starting (acceleration) and during stoppage (deceleration) of the machine and possibly during certain other stages when the machine is to operate at less than nominal speed (for example, when it is desirable to slow down the machine due to malfunctioning of another machine in the same production line).

The regulating circuit 72 constitutes an optional but highly desirable and advantageous part of the improved apparatus. This circuit ensures that the selection of pulse length and/or radiation intensity can be influenced by one or more qualities of the finished articles, particularly the aforediscussed draw resistance and the degree of ventilation. The circuit 72 ensures that the acceptability of the finished articles is satisfactory because the pulse length and/or the intensity of radiation is influenced by the monitored speed of the wrapping material as well as by the qualities or characteristics of the finished articles.

Another important advantage of the improved method and apparatus is that the appearance of the perforation zones does not change in response to changes of the speed of wrapping material. Such appearance is determined primarily by the length of holes which are formed by the beam 48 or 56, and the length remains at least substantially unchanged due to the aforediscussed regulation of the pulse length and radiation intensity.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of perforating wrapping material for rod-shaped products of the tobacco processing industry, comprising the steps of conveying the wrapping material along a predetermined path at a variable speed; directing at least one high-energy, variable-intensity pulsed radiation beam upon the wrapping material in a predetermined portion of said path; monitoring the speed of the wrapping material; generating signals denoting the speed of the wrapping material; altering the length of pulses of the at least one beam as a function of variations of the speed of the wrapping material; and utilizing said signals to adjust the intensity of the at least one beam as a function of variations of the speed of the wrapping material.

2. The method of claim 1, wherein said conveying step is carried out in a variable-speed machine and said signals denote the speed of the machine.

3. The method of claim 1, wherein said conveying step is carried out in a variable-speed machine and said signals denote the speed of the machine.

4. The method of claim 1, wherein said conveying step includes advancing the wrapping material at a nominal speed and said altering step includes maintaining the length of pulses at a nominal value when the speed of wrapping material matches or approximates said nominal speed.

5. The method of claim 1, wherein said conveying step includes advancing the wrapping material at a nominal speed and the intensity of said at least one beam is maintained at a nominal value when the speed of wrapping material matches or approximates said nominal speed.

6. The method of claim 1, wherein the wrapping material is an elongated web.

7. The method of claim 1, wherein the wrapping material includes a succession of tubular wrappers each of which surrounds a rod-like filler of fibrous material.

8. The method of claim 1, further comprising the steps of monitoring at least one characteristic of rod-shaped products which is dependent upon the permeability of perforated wrapping material, and altering the length of pulses of the at least one beam when the monitored characteristic deviates from a reference value until the monitored characteristic at least approximates the reference value.

9. A method of perforating wrapping material for rod-shaped products of the tobacco processing industry, comprising the steps of conveying the wrapping material along a predetermined path at a variable speed; directing at least one high-energy, variable-intensity pulsed radiation beam upon the wrapping material in a predetermined portion of said path; monitoring at least one variable parameter; altering the length of pulses of the at least one beam as a function of monitored variations f the at least one parameter, said altering step including reducing the length of pulses of the at lease one beam in response to increasing speed and increasing the length of pulses of the at least one beam in response to decreasing speed of the wrapping material; and increasing the intensity of the at least one beam in response to increasing speed and reducing the intensity of the at least one beam in response to decreasing speed of the wrapping material.

10. Apparatus for perforating wrapping material for rod-shaped products of the tobacco processing industry, comprising means for conveying wrapping material along a predetermined path at a variable speed; a source of variable-intensity high-energy pulsed radiation; means for directing at least one beam of radiation from said source into a predetermined portion of said path; means for monitoring the speed of the wrapping material; and means for altering the length of pulses and the intensity of the at least one beam in response to monitored variations of the speed of the wrapping material.

11. The apparatus of claim 10, wherein said source includes a laser.

12. The apparatus of claim 10 for perforating a running web of wrapping material, wherein said conveying means includes means for advancing the web along said path and said directing means includes means for directing the at least one beam upon the running web of wrapping material.

13. The apparatus of claim 10 for perforating wrapping material in a filter tipping machine wherein the wrapping material is conveyed along said path in the form of a series of discrete tubular wrappers each of which surrounds a rod-like filler of fibrous material, wherein said directing means includes means for directing the at least one beam against successive wrappers of said series.

14. The apparatus of claim 10, further comprising means for testing at least one variable characteristic of rod-shaped products which is dependent upon the porosity of perforated wrapping material and for generating signals denoting the at least one characteristic, and means for processing said signals and for transmitting the processed signals to said altering means.

15. Apparatus for perforating wrapping material for rod-shaped products of the tobacco processing industry, comprising means for conveying wrapping material along a predetermined path at a variable speed; a source of variable-intensity high-energy pulsed radiation; means for directing at least one beam of radiation from said source into a predetermined portion of said path; means for monitoring the speed of the wrapping material; and means for altering at least one of a plurality of variable qualities of the at least one beam in response to monitored variations of the speed of the wrapping material, said variable qualities including the length of pulses and the intensity of the at least one beam, and said altering means comprising means for determining the intensity of the at least one beam as a function of monitored speed of the wrapping material and for generating first signals denoting the determined intensity, means for determining the length of pulses of the at least one beam as a function of monitored speed of the wrapping material and for generating second signals denoting the determined length of pulses, and means for processing said first and second signals into third signals which are transmitted to said source to influence the length of pulses and the intensity of the at least one beam.

16. The apparatus of claim 15, wherein said altering means further comprises a memory for fourth signals denoting the frequency of pulses, said processing means having an input connected with said memory.

17. The apparatus of claim 15, wherein said source comprises a first unit which is connected with said directing means and a second unit which is connected between said processing means and said first unit.

18. Apparatus for perforating wrapping material for rod-shaped products of the tobacco processing industry, comprising means for conveying wrapping material along a predetermined path at a plurality of different speeds; a source of variable-intensity high-energy pulsed radiation; means for directing at least one beam of radiation from said source into a predetermined portion of said path; means for monitoring at least one variable parameter, said monitoring means including means for generating signals denoting the speed of the wrapping material; and means for altering at least one of a plurality of variable qualities of the at least one beam in response to monitored variations of the at least one variable parameter, said variable qualities including the length of pulses and the intensity of the at least one beam, and said altering means comprising means for storing a reference speed of the wrapping material, a reference pulse length and a reference intensity, and means for imparting to the at least one beam said reference pulse length and said reference intensity when the monitored speed of the wrapping material matches or approximates said reference speed.

19. Apparatus for perforating wrapping material for rod-shaped products of the tobacco processing industry, comprising means for conveying wrapping material along a predetermined path; a source of variable-intensity high-energy pulsed radiation; means for directing at least one beam of radiation from said source into a predetermined portion of said path; means for monitoring at least one variable parameter; means for testing at least one variable characteristic of rod-shaped products which is dependent upon the porosity of perforated wrapping material and for generating signals denoting the at at least one characteristic; means for altering at least one of a plurality of variable qualities of the at least one beam in response to monitored variations of the at least one variable parameter said variable qualities including the length of pulses and the intensity of the at least one beam, and said altering means comprising means for storing a variable reference pulse length and for varying said reference pulse length in dependency on deviations of said at least one variable characteristic from a predetermined value; and means for processing said signals and for transmitting the processed signals to said altering means.

20. The apparatus of claim 19, wherein said conveying means comprises means for advancing the wrapping material at a variable speed, said monitoring means including means for monitoring the speed of wrapping material.

21. The apparatus of claim 20, wherein said altering means comprises means for determining the length of pulses of the at least one beam as a function of monitored speed of the wrapping material.

22. The apparatus of claim 20, wherein said altering means comprises means for determining the intensity of the at least one beam as a function of monitored speed of the wrapping material and for generating first signals denoting the determined intensity.

* * * * *